United States Patent [19]

Raleigh

[11] Patent Number: 4,754,554
[45] Date of Patent: Jul. 5, 1988

[54] COORDINATE MEASURING MACHINE WITH A SELECTIVELY ENGAGABLE LIMITED RANGE FINE FEED MECHANISM

[75] Inventor: Freddie L. Raleigh, Centerville, Ohio

[73] Assignee: The Warner & Swasey Company, Dayton, Ohio

[21] Appl. No.: 912,706

[22] Filed: Sep. 29, 1986

[51] Int. Cl.⁴ .............................................. G01B 7/03
[52] U.S. Cl. ..................................... 33/503; 74/89.15
[58] Field of Search ............... 33/1 M, 503; 74/89.15, 74/424.8 R, 531, 156, 145, 127; 24/463, 460–462

[56] References Cited

U.S. PATENT DOCUMENTS

| | | | |
|---|---|---|---|
| 2,283,089 | 5/1942 | Pfauser | 24/463 |
| 3,057,599 | 10/1962 | Clatterbuck | 24/463 |
| 3,165,834 | 1/1965 | Benton | 33/503 |
| 3,384,970 | 5/1968 | Avalear | 33/503 |
| 3,628,386 | 12/1971 | Blum | 75/89.15 |
| 3,817,111 | 6/1974 | Allen | 74/156 |
| 3,840,993 | 10/1974 | Shelton | 33/503 |

*Primary Examiner*—William A. Cuchlinski, Jr.
*Assistant Examiner*—Patrick R. Scanlon
*Attorney, Agent, or Firm*—John R. Benefiel; Raymond J. Eifler

[57] ABSTRACT

A coordinate measuring machine (1) of the type having a plurality of movable members, a probe (2), carriage (5), and bridge (6), each movable along an orthogonal axis adjacent member (16), in which a selectively engageable fine feed mechanism (10) is disclosed providing a limited range of precision adjustment of movement each movable member anywhere along the total range of member movement. The mechanism (10) includes a pair of opposing locking elements (18), selectively spreadable to frictionally engage a slot (20) formed in the adjacent member (16); and also including an adjustment knob (44) axially fixed relative to the locking elements in mounting plate (12) attached to a movable member or fixed member, rotation of the adjustment knob (44) allowing precision adjustment of the position of the movable member after the locking element (18) is engaged with the slot (20).

The alternate embodiment of mechanism (10) includes a pair of opposing locking elements (80, 82) selectively speadable to frictionally engage a slot (20) formed in the adjacent member (16); and including an adjustment knob (108) axially fixed relative to the locking elements and threadably engaging a mounting plate (12) attached to a movable member or fixed member, rotation of the adjustment knob (108) allowing precision adjustment of the position of the movable member after locking elements (80, 82) are engaged with the slot (20).

10 Claims, 4 Drawing Sheets

COORDINATE MEASURING MACHINE WITH A SELECTIVELY ENGAGABLE LIMITED RANGE FINE FEED MECHANISM

This invention concerns coordinate measuring meachines having a plurality of members each movable along an axis orthogonal to the other to measure an object and more particularly to the movement of each member in large increments and smaller precisely controlled increments.

BACKGROUND

It is sometimes desirable to provide a fine feed position adjustment between members which are movable over a relatively great range of motion. This necessitates a disengagement of the mechanism to allow rapid movement of the members to reach the points where such fine adjustments are necessary.

As an example, in some types of coordinate measuring machines, an X-axis carriage member is mounted for movement along ways on a member of a Y-axis bridge which is in turn mounted on a supporting base member, so as to carry a probe along orthogonal X and Y axes to carry out measurements of objects supported on a table fixed to the base. The probe itself is also mounted for vertical or Z axis motion of the probe tip.

In lower cost versions of such machines, the carriage, bridge, and probe members are each moved manually along guide ways during measuring operations, and these members may be moved through a relatively great range of motion in moving the probe to reach particular features on the measured object.

It is desirable to have a fine feed mechanism for carrying out the final stages of probe movement along a given axis after it has been manually traversed to approach the point of interest on the measured object. Thus, in order to move these members along their respective support ways to quickly reach a point of interest on the object, such fine feed mechanisms must be disengageable to allow such manual motion.

In U.S. Pat. No. 3,817,111 issued on June 18, 1974, to Paul E. Allen, for a "LOCK AND TRAVERSE FINE FEED MECHANISM AND BEARING ARRANGEMENT FOR A MEASURING MACHINE CARRIAGE", there is disclosed a mechanism for accomplishing this result, but which requires relatively costly components, including a threaded shaft and brake bar each extending the full length of the travel of the carriage. The threaded shaft, being a separately supported member, may also sag excessively which sagging could interfere with proper operation if disposed horizontally, and thus must be of substantial diameter to be of sufficient rigidity. This increased size requirement increases the cost of the machine.

Since it is important that such fine feed mechanisms providing this capability be able to be manufactured at low cost an arrangement which did not require such substantial separate members would be advantageous.

SUMMARY OF THE INVENTION

The present invention is a coordinate measuring machine having a series of three members, typically a probe, carriage and bridge, each movable in the direction of one of three orthogonal axes on a respective support member with adjacent structure fixed against movement in that direction. A lengthwise feature such as a slot is formed on or into one of the movable members or adjacent fixed structure, extending along the entire extent of movement of the other member, with a disengagable fine feed mechanism mounted to the other of the movable or adjacent fixed structure. The mechanism includes a pair of elements that extend into the slot and engage the sides thereof upon manipulation of a control means to allow operation of the fine feed mechanism.

In the first described embodiment, the fine feed mechanism incorporates a mounting plate affixed to the other of the movable or support members, the mounting plate carrying a finely threaded adjustment knob threadably engaging a control shaft which operates the locking elements to grip the elongated feature. Rotation of the adjustment knob thereby causes axial movement of the control shaft. The adjustment knob is axially fixed to the mounting plate, while the control shaft is axially located on the locking elements, to provide a fine feed adjustment of the relative position of the movable member only when the locking elements are engaged with the slot.

The locking elements in the first embodiment comprise a spaced, facing pair of flexible blades clamped at one end to a carrier block, and having their free ends disposed aligned within the slot.

The control shaft passes between the blades and is formed with a camming portion located in the space between the elements, the camming portion forcing the blades apart upon rotation of the control shaft to the locking position, to cause the blades to assume a spread apart position in which the blade free ends firmly engage the sides of the slot and are thereby securely locked.

The carrier block and the locking elements are moved as a unit with the control shaft upon rotation of the concentrically mounted adjustment knob. A guide pin is mounted to the mounting plate parallel to and spaced from the control shaft and adjustment knob and slidably received in the carrier block to ensure that the blades do not tilt in the slot.

The blades, when locked securely to the slot by the spreading action of the control shaft camming portion, are relatively rigid along the direction of movement of the members, so that very accurately controlled fine adjustment of the relative position of the movable members is afforded by the mechanism within a limited range anywhere within the entire range of motion of the movable members.

In a second embodiment, preferred where a higher locking force is desirable, the locking elements are comprised of pivotally connected rigid elements spread apart by pneumatic pressure acting on a diaphragm. The free ends of the rigid locking elements are disposed in the slot to establish a high force frictional lock when the pneumatic pressure is communicated to the diaphragm by selective operation of a control valve.

The rigid locking elements of the second embodiment are mounted by a flexure to the carrier block, in turn engaged by the threaded adjustment knob. The flexure allows balanced force of engagement of each locking element to the slot.

An advantage of the present invention is the low cost but precision fine feed mechanism selectively engageable anywhere along a relatively great range of motion of the movable members of a coordinate measuring machine, and which does not require a separately supported member extending along the entire extent of movement of the member.

DETAILED DESCRIPTION OF THE INVENTION

Figure 1:
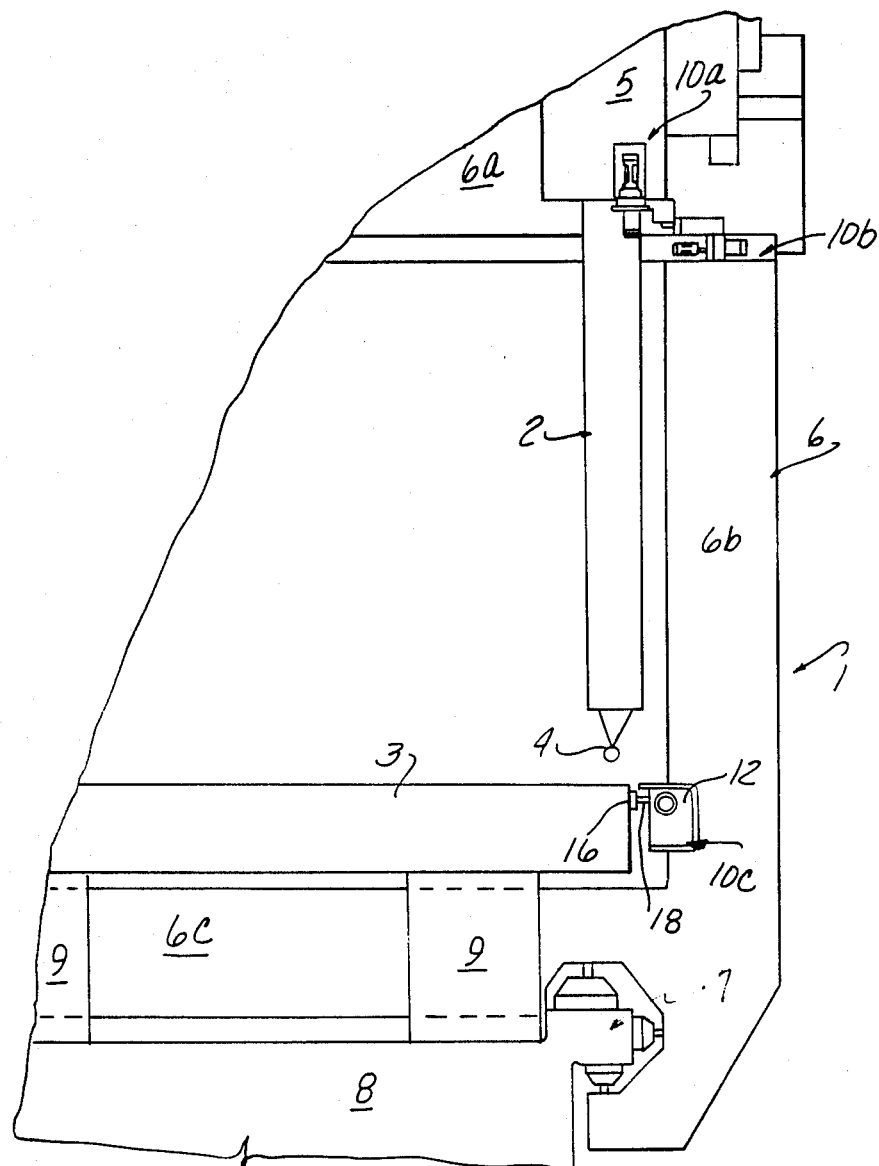
FIG. 1 is a fragmentary front elevational view of the coordinate measuring machine according to the present invention, incorporating a selectively engageable limited range fine feed mechanism.

FIGRE 4A is a sectional view through the locking elements of the fine feed mechanism taken in FIG. 1, disposed in a slot extending along of the support members, shown in the unlocked position.

Figure 4A:
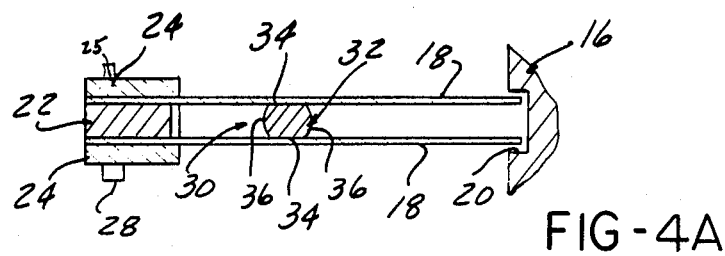
Figure 4B:
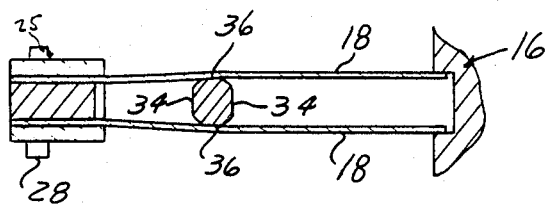

FIG. 4B is a view of the components depicted in FIG. 4A, shown in the locked position.

Figure 5:
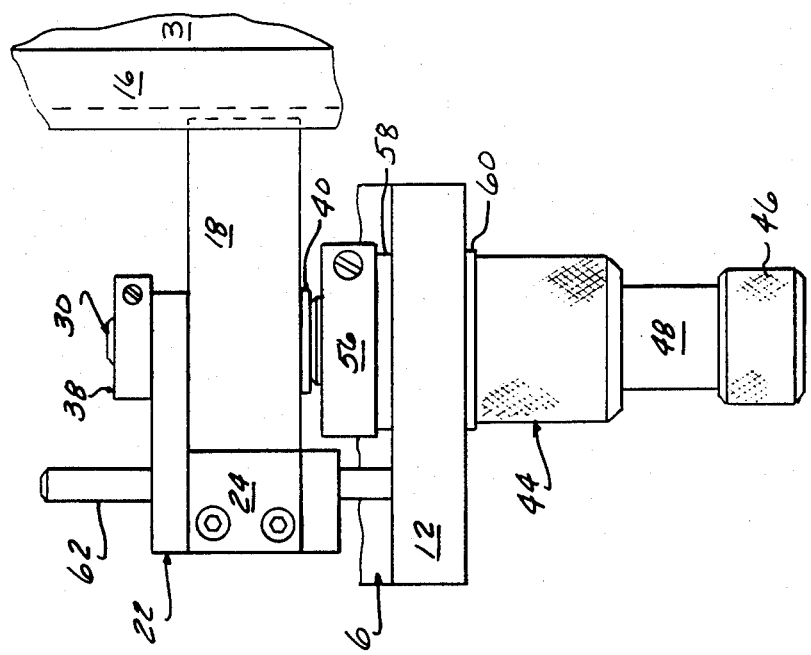

FIG. 5 is a plan view of the selectively engageable fine feed mechanism shown in FIG. 1, shown in the fully retracted position.

Figure 6:
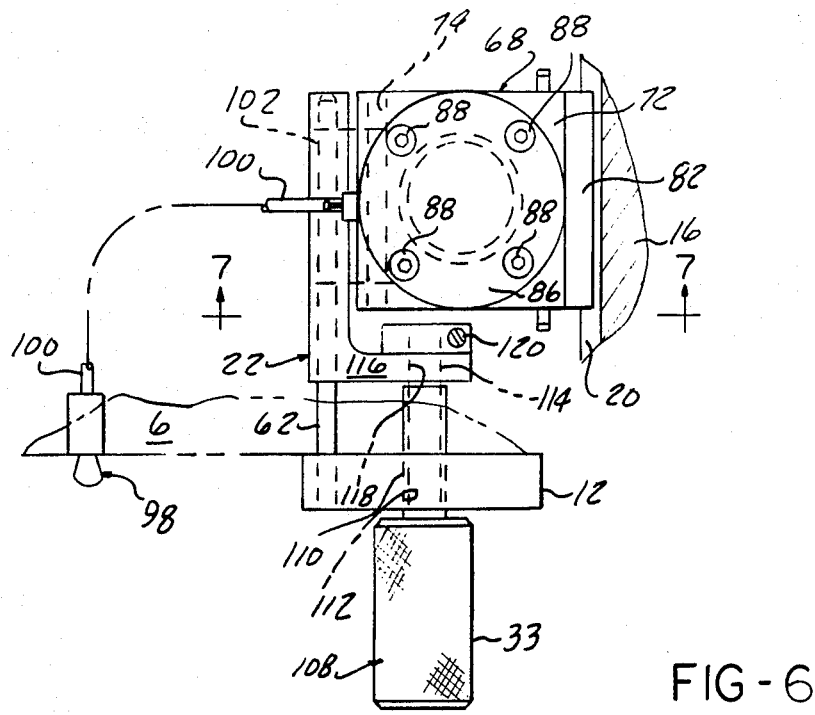

FIG. 6 is plan view of an alternate embodiment of the limited range fine feed mechanism according to the present invention.

Figure 7:
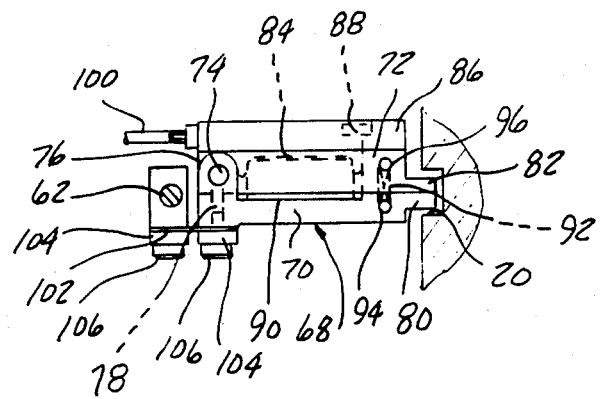

FIG. 7 is a sectional view of the fine feed mechanism shown in FIG. 6, taken along the lines 7—7 in FIG. 6.

FIG. 1 shows a coordinate measuring machine 1 having a probe 2 supported over a fixed table 3 to allow the tip 4 to be movable along each of the three orthogonal axes so as to carry out measurements on an object (not shown) supported on the table's upper surface.

In order to provide such probe tip motion, a series of movable members are provided, each mounted on a respective support member for movement along a respective axis.

The probe 2 constitutes one such movable member, mounted on an X-axis carriage 5, the carriages consituting a respective support member vertically movable along the Z-axis and also comprising adjacent structure fixed against movement in the direction of the Z-axis.

The carriage 5 in turn also constitutes another of the series of movable members, and is mounted on an upper cross member 6A of a bridge 6, comprising its respective support member to be movable along the horizontal X-axis, orthogonal to the Z-axis. The cross member 6A comprises structure adjacent the carriage which is fixed against movement in the direction of the X-axis.

The bridge 6 is formed to comprise a closed ring by a pair of vertical upstanding members 6B connected at the top by upper cross member 6A, and at the bottom by lower cross member 6C. The bridge 6, while being fixed against movement in the direction of the X-axis, is movable along a Y-axis orthogonal to the Z and X-axes on ways 7 of a base 8 which comprises the associated support member for bridge 6.

Table 3 is supported on the base 8 by a series of pedestals 9, which together constitute adjacent structure fixed against movement in the direction of movement of the bridge 6 along the Y-axis.

A coordinate measuring machine having this "ring" bridge construction is described in U.S. Pat. No. 4,594,791, issued June 17, 1986, for "A BRIDGE TYPE COORDINATE MEASURING MACHINE".

Such machines are manufactured and sold by Sheffield Measurement Division of the Warner & Swasey Company, Dayton, Ohio, under the trademarks "Cordax", and "Apollo".

According to the concept of the present invention, a limited range, selectively engageable fine feed mechanism 10 is operatively associated with each of the movable members and its respective support member, i.e., a mechanism 10A, with the probe 2 and X-axis carriage 5; a mechanism 10B with the X-axis carriage 5 and bridge 6; and a mechanism 10C with the bridge 6 and fixed table 3.

Figure 2:
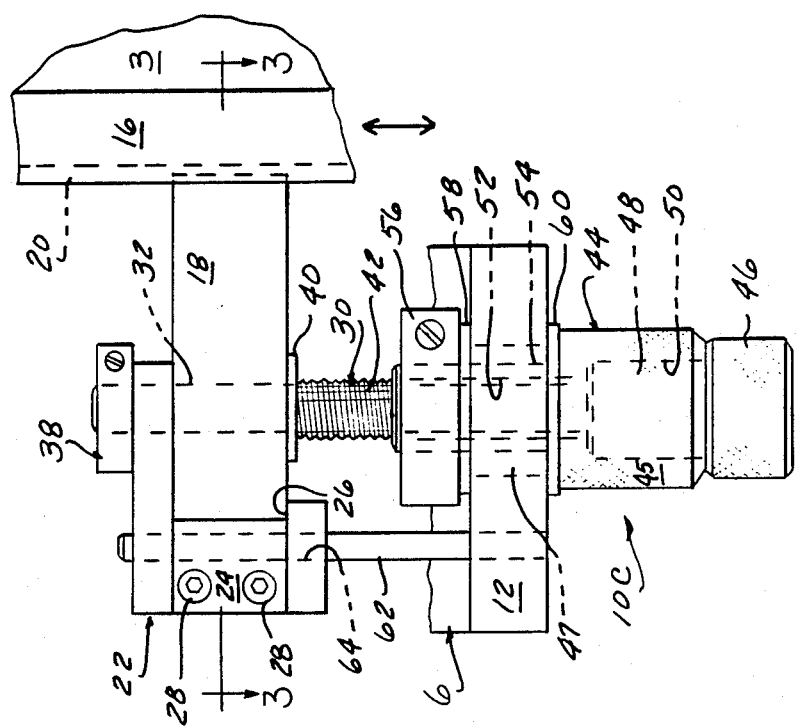
FIG. 2 is a plan view of a selectively engageable limited range fine feed mechanism according to the present invention in the fully extended position, together with fragmentary portion of one of the connected movable or support members.

FIG. 2 shows the components comprising each of the selectively engageable fine feed mechanisms 10 with mechanism 10C shown as representative of each of the other mechanisms 10A and 10B. Mechanism 10C includes a mounting plate 12 adapted to be attached to the bridge, supported to be movable along the table 3 with a member 16 fixed to the side of the table 3 adjacent the carriage portion of the bridge 6 to which the mechanism 10C is mounted.

The limited range fine feed mechanism 10C in this embodiment includes selectively engageable locking elements comprised of a facing pair of thin flexible metal blades 18 having the free ends thereof disposed in a slot feature 20 formed in the fixed member 16, which extends parallel to the direction of movement of the bridge 6.

Figure 3:
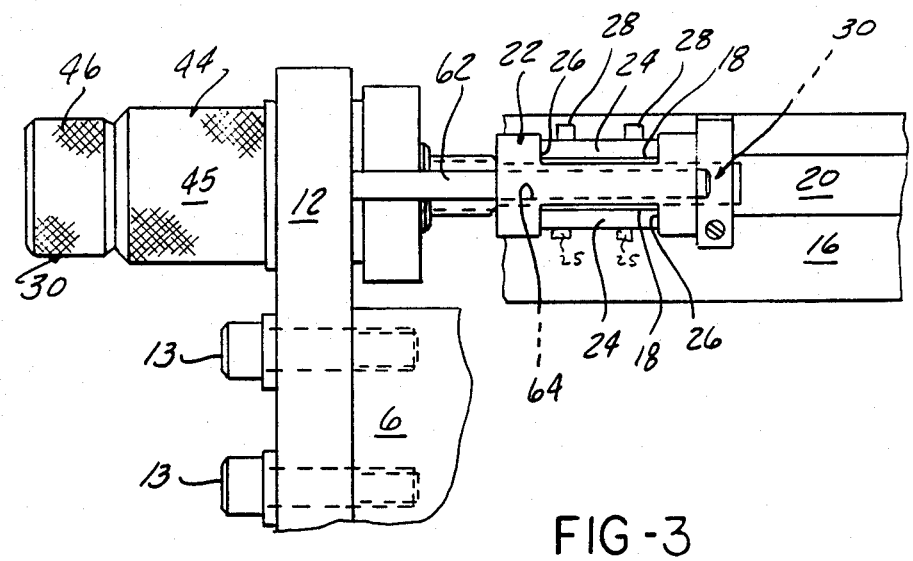
FIG. 3 is a side view of the selectively engageable fine feed mechanism shown in FIG. 1, with fragmentary portions of each of the connected movable and support members.

FIG. 3 shows that the blades 18 are fixed at their other ends to a carrier block 22 by a pair of clamping plates 24 received in recesses 26 of the carrier block 22, with cap screws 28 passing through the upper clamping plate 24 and lower clamping plate 24 and secured with nuts 25.

A rotatable control shaft 30 is formed with a camming section 32 passing between the blades 18 at a point intermediate their length.

FIGS. 4A and 4B show that the camming section 32 is formed with flats 34 spaced apart a distance equal to the normal spacing of the blades 18 established by the width of the portion of the carrier block 22 against which the blades 18 are clamped by clamping plates 24. Camming section 32 is also formed with oppositely disposed radiused camming surfaces 36 extending to a greater transverse dimension than that of the slot 20, so that if control shaft 30 is rotated 90° from an unlocked position to a predetermined rotary position, the mid points of the blades 18 are forced apart.

FIG. 4B shows that this causes the free ends thereof to be brought into firm frictional engagement with the sides of the slot 20 to lock the blades 18 to member 16. It is noted that the blades 18 are of substantial dimension in the direction of relative movement so as to be rigid along the direction of movement of bridge 6, while being flexible in the transverse direction of their spreading motion.

The blades 18 and carrier block 22 are secured to the control shaft 30 so as to be axially fixed with respect thereto, while allowing rotation, by means of a clamping collar 38 gripping the end of the control shaft 30 protruding beyond the carrier block 22, and a washer 40 which also acts to prevent the threads of finely threaded section 42 from bearing against the edges of the blades 18.

Threaded section 42 of control shaft 30 passes within a rotatable fine feed adjustment element comprised of adjustment knob 44, control shaft 30 terminating in a knob end 46, concentric to adjustment knob 44 and located axially outward therefrom. An enlarged pilot portion 48 is slidably fit within a counterbore 50 extending into the large knob end 45 of fine feed adjustment knob 44. A bushing 47 mounted in mounting plate 12 rotatably supports a small diameter pilot end 54 of adjustment knob 44.

The finely threaded section 42 is threadably engaged in an internally threaded bore 52 extending from a small diameter pilot end 54 of fine feed adjustment knob 44 to the counterbore 50.

The small diameter pilot end 54 of adjustment knob 44 is axially located with respect to mounting plate 12 by means of a clamping collar 56 received around small diameter end 54 and seated against washer 58 which together with washer 60 axially locate either side of mounting plate 12 on the fine feed adjustment knob 44.

Axial movement of the blades 18 and carrier block 22 towards and away from mounting plate 12 is induced by rotation of the fine feed adjustment knob 44. Thus, once the knob end 46 of control shaft 30 is rotated to the locked position, fine feed adjustment movement of between the bridge 6 and adjacent relatively fixed structure 16 may be accomplished by rotation of the adjustment knob 44.

In order to provide accurately controlled movement of the blades 18, a guide pin 62 is fixed in the mounting plate 12 to extend in a parallel direction to the line of movement thereof, and is slidably received in a bore 64 extending through the carrier block 22.

FIG. 5 shows that the relative position of bridge 6 and adjacent fixed structure 16 is accurately adjustable through a limited range of motion from the fully extended position shown in FIG. 2, in which the diameter of section 48 of the control shaft 30 is seated against the bottom of counterbore 50, to the fully retracted position shown in FIG. 5, in which the washer 40 bottoms against the small diameter end of the fine feed adjustment knob 44.

This limited range of fine feed adjustment is available anywhere in the much more extensive range of motion of the bridge 6 by virtue of the selective locking action between blades 18 and slot 20.

It can be appreciated that the mechanism is simple, compact, and able to be manufactured at low cost, and does not require a separately supported member extending along the entire range of movement along each axis, such as the threaded shaft described in U.S. Pat. No. 3,817,111 referred to above.

FIGS. 6 and 7 show an alternate embodiment, preferred where higher holding forces are desirable. In this embodiment, a locking assembly 68 includes a pair of rigid locking elements, a hinge plate 70 and diaphragm block 72, pivoted to each other at one end with a pivot pin 74 passing through a clevis connector 76. A set screw 78 secures pivot pin 74.

Each of the free ends 80, 82 of the hinge plate 70 and diaphragm block 72 respectively, are disposed in the slot 20 of member 16, so as to establish a frictional lock upon spreading of the hinge plate 70 and diaphragm block 72.

Such spreading is achieved by application of air pressure to one side of the diaphragm 84 secured to the diaphragm block 72 by a cylindrical cap 86 and screws 88. The diaphragm 84 engages a piston 90 interposed between it and the hinge plate 70, so that upon communicating air pressure above the diaphragm 84, the hinge plate 70 and diaphragm block 72 are urged apart.

Return springs 92 are hooked to rods 94 and 96 carried by the hinge plate and diaphragm block 72 respectively so as to return with the same to an abutting relationship out of engagement with the slot 20.

Air pressure is selectively communicated via a toggle valve 98 carried by bridge 6 and line 100, so as to enable convenient control over the locking action with slot 20.

The locking assembly 68 is mounted to a carrier block 22 by means of a flexure 102, secured by clamps 104 and screws 106. This allows a self balancing of the diaphragm block 72 and hinge plate 70 when engaging the slot 20.

An adjustment knob 108 is provided as in the above described embodiment, having a threaded portion 110 received in a threaded bore 112 of mounting plate 12. The far end 114 of the adjustment knob 108 is axially fixed to end wall 116 of the carrier block 22 by being passed through a bore 118 therein and clamped with clamps 120.

Thus, upon rotation of adjustment knob 108, carrier block 22, and the locking assembly 68, are moved on guide pin 62 from mounting plate 12, to thereby enable a corresponding positional adjustment between bridge 6 and member 16 when the locking assembly 68 is activated.

In operation, to measure an object, the probe 2, carriage 5, or bridge 6 are moved manually to cause the tip 4 of the probe to approach a point predetermined on the object to be measured.

The locking elements 18 or 70, 72 of each locking mechanism 10 are then engaged with the slot 20 by rotation of knob 46 or operation of valve 98 thereby engaging the fine feed mechanism that allows precisely controlled movement of the probe tip 4 to the point on the object.

The knob 44 of each mechanism 10 is then rotated to move the probe tip 4 into contact with the point on the object. The probe tip 4 is then moved to other predetermined points where location readings are taken to measure the object.

I claim:

1. A coordinate measuring machine (1) having a series of movable machine members comprised of a probe (2), a carriage (5), and a bridge (6) and a series of adjacent fixed structures comprised of the carriages(5), the bridge(6) and a table(3), wherein the probe(2), the carriage(5) and the bridge(6) are movable relative to the carriage(5), the bridge(6) and the table(3), respectively, along one of three orthogonal axes to carry out measurements on an object, characterized by a selectively engagable, limited range fine feed mechanism (10) for providing precision control over said relative movement of at least one of said movable members (2,5,6) over a limited extent of the entire range of relative movement of the member, comprising:

a feature (20) formed on at least one of said movable members (2,5,6) or said adjacent fixed structure (5,6,3), said feature extending parallel to the direction of said movement of said at least one said movable member, for a distance substantially equal to the extent of said movement of said at least one member;

at least one movable locking element (18,70,72) carried by the other of said at least one of said movable members (2,5,6) or adjacent fixed structure (5,6,3), said at least one movable locking element (18,30,22) selectively engageable with said feature (20) and including selectively operable control means (30,32,98,84) for moving said at least one locking element (18,70,72) into engagement with said feature (20); and adjustment means (44,50,42,108,112) including an adjustable position control element (44,108) and a mounting plate (12) fixed to the other of said at least one of said movable members (2,5,6) or adjacent fixed structure and means (62,30) mounting said mounting plate (12) and said at least one locking element (18,70,72) together so as to allow a limited range of relative movement along the direction of movement of said at least one movable member (2,5,6) said adjustment means (44,50,42,108,112) allowing selective adjustment of the relative position between said at least one locking element (18,70,72) and said mounting plate (12) in the direction of said relative movement between said movable member and adjacent fixed structure whenever movement of said control element (44,108) is carried out, whereby adjustment of said relative position between said mounting plate (12) and said at least one locking element (18,70,72) adjusts the relative positions between said at least one of said movable members and said adjacent fixed structure only when said selectively operable control means (30,32) is operated to engage said at least one locking element (18,70,72) with said feature (20).

2. The coordinate measuring machine (1) according to claim 1 wherein said control means further includes a selectively actuable rotatable control shaft (30) having a portion (32) engagable with said at least one locking element (18) and causing said movement of said at least one locking element (18) to engage said feature (20) upon rotation of said control shaft (30) to a predetermined rotary position.

3. The coordinate measuring machine (1) according to claim 1 further comprising a pair of locking elements (18, 70, 72) each having ends (80, 82) thereof located on either side of said feature (20), and wherein said control means (30, 32, 84, 98) causes relative movement therebetween on actuation thereof said pair of locking elements (18) configured so that said ends (80, 82) on either side of said feature (20) are moved into engagement with said feature (20) upon actuation of said control means (30, 32, 84, 98).

4. The coordinate measuring machine (1) according to claim 3 wherein said pair of locking elements (18) comprise a pair of flexible blades (18), said feature (20) comprises a slot (20) extending along the direction of relative movement between said at least one of said movable members and adjacent fixed structure and having one end of each of said blades (18) disposed in said slot (20), and further including a carrier block (22) and clamping means (24,28) fixing the other end of each of said flexible blades (18) parallel and facing each other with a predetermined space therebetween so that said flexible blades normally fit within said slot (20) without engagement therebetween.

5. The coordinate measuring machine (1) according to claim 3 wherein said pair of spaced locking elements are rigid members each pivoted together at one end, and wherein the other ends (80,82) are free and are disposed on either side of said feature (20).

6. The coordinate measuring machine (1) according to claim 2 wherein said fine adjustable position control element (44) is rotatably mounted to said mounting plate (12) and axially fixed thereto to produce said relative position adjustment and includes a control knob portion (45) concentrically mounted to said control shaft (30).

7. The coordinate measuring machine (1) according to claim 6 wherein said adjustable position control element (44) threadably engages said control shaft (30) to cause axial relative movement therebetween upon rotation of said control knob portion (45), said axial movement parallel to said direction of relative movement between said movable member and fixed structure.

8. The coordinate measuring machine (1) according to claim 7 wherein said control shaft (30) passes within said adjustable position control element (44) and has an externally threaded portion (42), said adjustable position control element (44) having an internally threaded bore (52) mating with the externally threaded portion of said control shaft (30).

9. The coordinate measuring machine (1) according to claim 5 wherein said control means comprises pneumatic pressure actuator means (84, 98) interposed to cause spreading of said locking elements (70, 72) upon actuation thereof.

10. The coordinate measuring machine (1) according to claim 5 further including a carrier block (22) and flexure means (102) mounting said locking elements (70, 72) to said carrier block (22) for axial movement together therewith, while allowing relative transverse movement to insure balanced engagement with said feature (20).

* * * * *